(12) United States Patent
Cagno et al.

(10) Patent No.: US 7,949,489 B2
(45) Date of Patent: *May 24, 2011

(54) DETECTING CABLE LENGTH IN A STORAGE SUBSYSTEM WITH WIDE PORTS

(75) Inventors: Brian James Cagno, Tucson, AZ (US); Gregg Steven Lucas, Tucson, AZ (US); Thomas Stanley Truman, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 693 days.

This patent is subject to a terminal disclaimer.

(21) Appl. No.: 11/828,687

(22) Filed: Jul. 26, 2007

(65) Prior Publication Data

US 2009/0030649 A1 Jan. 29, 2009

(51) Int. Cl.
*G01R 13/00* (2006.01)
(52) U.S. Cl. .......................................................... 702/158
(58) Field of Classification Search .................... 702/158
See application file for complete search history.

(56) References Cited

U.S. PATENT DOCUMENTS

| | | | |
|---|---|---|---|
| 4,771,230 A | 9/1988 | Zeh | |
| 5,592,077 A | 1/1997 | Runas et al. | |
| 5,818,378 A | 10/1998 | Cheng et al. | |
| 5,838,726 A | 11/1998 | Nemoto et al. | |
| 5,953,384 A | 9/1999 | Walsh et al. | |
| 6,646,454 B2 | 11/2003 | Watkins | |
| 6,727,712 B2 | 4/2004 | Sabey | |
| 7,068,044 B1 | 6/2006 | Lo et al. | |
| 7,075,283 B1 | 7/2006 | Lo et al. | |
| 7,133,956 B2 | 11/2006 | Handa et al. | |
| 7,135,873 B2 | 11/2006 | McCosh | |
| 7,302,379 B2 * | 11/2007 | Cioffi et al. | 703/20 |
| 2003/0161630 A1 | 8/2003 | Jayaram et al. | |
| 2003/0165340 A1 | 9/2003 | Jayaram et al. | |
| 2005/0066203 A1 | 3/2005 | Handa et al. | |

(Continued)

FOREIGN PATENT DOCUMENTS

JP 09166406 A 6/1997

(Continued)

OTHER PUBLICATIONS

Dimmick et al., "Differential-Single-Ended SCSI Interface Description", IBM Technical Disclosure Bulletin, Apr. 1991, pp. 331-335.

(Continued)

*Primary Examiner* — Tung S Lau
(74) *Attorney, Agent, or Firm* — Stephen R. Tkacs; Stephen J. Walder, Jr.; Randell J. Bluestone (57) ABSTRACT

A mechanism detects cable length in a storage subsystem with wide ports. The mechanism uses in-situ bidirectional cable wrapping for determining different cable lengths. The mechanism under-margins transmitter output to failure for each external port and even for each PHY within a wide port. Based on the transition point from "good" wrap to "bad" wrap, the cable length may be determined. The transition point identifies if the cable is long or short, at which point the optimum tuning parameters can accordingly be set. A calibration mechanism calibrates the high speed transmitter/receiver pair characteristics, and, thus, optimizes the transmission performance between subsystems. The calibration mechanism mitigates the need for frequent error correction and does not incur the performance degradation associated with error correction techniques.

20 Claims, 9 Drawing Sheets

U.S. PATENT DOCUMENTS

| | | |
|---|---|---|
| 2005/0125710 A1 | 6/2005 | Sanghvi |
| 2005/0190690 A1 | 9/2005 | Tran |
| 2006/0265191 A1 | 11/2006 | Van Leerdam |
| 2008/0034137 A1 | 2/2008 | Whitby-Strevens |
| 2008/0071516 A1 | 3/2008 | Cioffi et al. |
| 2008/0192814 A1 | 8/2008 | Hafed et al. |
| 2008/0205501 A1 | 8/2008 | Cioffi et al. |

FOREIGN PATENT DOCUMENTS

| | | |
|---|---|---|
| JP | 2000-183938 | 6/2000 |

OTHER PUBLICATIONS

Hsieh et al., "Simultaneous Bi-Directional Signaling With Adaptive Pre-Emphasis", Proceedings of the 2004 International Symposium on Circuits and Systems, ISCAS 2004, IEEE, vol. 4, May 23-26, 2004, pp. 397-400.

Lin et al., "Implementing a Digitally Synthesized Adaptive Pre-emphasis Algorithm for use in a High-Speed Backplane Interconnection", Canadian Conference on Electrical and Computer Engineers, CCECE 2004-CCGEI 2004, Niagara Falls, IEEE, vol. 3, May 2004, pp. 1221-1224.

U.S. Appl. No. 11/828,649, filed Jul. 26, 2007, Cagno et al.

U.S. Appl. No. 11/828,667, filed Jul. 26, 2007, Cagno et al.

Office Action mailed Apr. 22, 2010 for U.S. Appl. No. 11/828,667, 15 pages.

Preliminary Amendment filed with the USPTO on Mar. 22, 2010 for U.S. Appl. No. 11/828,667, 8 pages.

Final Office Action mailed Aug. 31, 2010, U.S. Appl. No. 11/828,667, 9 pages.

Interview Summary mailed Jun. 30, 2010 for U.S. Appl. No. 11/828,667, 3 pages.

Response to Final Office Action filed Oct. 13, 2010, U.S. Appl. No. 11/828,667, 10 pages.

Response to Non-Final Office Action filed Jul. 20, 2010, U.S. Appl. No. 11/828,667, 11 pages.

U.S. Appl. No. 11/828,649, Image File Wrapper printed from Pair on Feb. 18, 2010, 2 pages.

* cited by examiner

DETECTING CABLE LENGTH IN A STORAGE SUBSYSTEM WITH WIDE PORTS

BACKGROUND

1. Technical Field

The present application relates generally to an improved data processing system and method. More specifically, the present application is directed to a method and procedure for detecting cable length in a storage subsystem with wide ports.

2. Description of Related Art

In storage network systems, high speed serial differential interfaces are used to interconnect multiple storage components. For example, in BladeCenter® products from IBM Corporation, a serially attached SCSI (SAS) switch may be used to interconnect the server blades to external storage, such as a typical storage enclosure. The server blades may be directly connected to the SAS switch via an internal high speed fabric. The SAS switch is connected to the external storage via external SAS cables.

Generally, multiple cable lengths are required for attaching storage at different distances from the SAS switch. The initial release of the first BladeCenter® storage product may require a "short" cable, such as three meters, and a "long" cable, such as eleven meters. Soon thereafter, the storage product may require longer cables, such as twenty meters.

As the high speed interfaces increase in data rate speed, it becomes necessary to selectively adjust the transmitter/receiver characteristics, such as pre-emphasis and de-emphasis. With significantly disparate cable lengths, it is difficult to optimize the high speed interface for both short and long cables. Therefore, it becomes necessary to determine the cable length attached to each port of the SAS switch. Furthermore, some scenarios may occur in which a short cable is inadvertently, or possibly deliberately, replaced with a long cable.

To accommodate the different cable lengths, created either by statically preplanned cabling procedures or by dynamically swapping cables in a customer location, it becomes necessary to dynamically determine cable lengths between a SAS switch and external storage. Several methods have been proposed and implemented in the prior art. For example, some fiber channel cables implement an embedded VPD (vital product data) circuit that includes cable length information. This has only been implemented with cables using small form factor pluggable (SFP) connections. Whether the cables are optical or copper, it remains that the necessary cable length information is implemented with some type of cable VPD, which is only accessible via some sort of out-of-band interface embedded within the high speed cable.

Furthermore, very recent SAS cabling technology employs the notion of a "wide" port. A wide port consists of multiple lanes or physical transceiver elements (PHYs). Today, SFPs are designed for a single port. It is quite impractical to provide a wide SFP for optical ports. For example, a four-wide port would require four laser transmitters and four receivers. Using a wide SFP for copper cabling would be more likely, but a significant cost adder would be required. It should be noted that SFPs, whether optical or copper, require an out-of-band interface, something that is heretofore not standardized or implemented.

A generally accepted bit error rate (BER) for high speed serial interfaces is $1 \times 10^{-12}$ (one error occurrence for every $10^{12}$ bits that are transferred). Some things that can affect high speed signaling include impedance variation caused by unexpected electrical discontinuities along the transmission path, high speed driver/receiver circuit defects, improper mating contacts caused by bent or damaged connector pins, incomplete connector mating caused by mechanical or installation problems, and signal coupling between adjacent signal paths. Individual components are tested to a performance range, but tolerance buildup can cause attenuation beyond nominal design targets. Often, performance parameters are guaranteed by the manufacturing process controls and not 100% tested. Therefore, there is an exposure to maverick defects.

Ideally, all the above problems are tested and verified by interconnect and subsystem manufacturers. However, often this is not the case, and such defects are introduced into the final system integration process. All the low speed circuitry (<1 GHz) can be adequately tested. The high speed circuitry must be carefully verified. A common technique is to wrap the high speed interfaces using a cable or wrap paths external to the subsystem; however, this does not cover the actual interface connections at the time of system integration.

As subsystem components are integrated into a system, the parametric variance from the nominal may cause a communication failure across the high speed interface. Aggravating factors may include customer data pattern, printed circuit variations and parasitics, connector parasitics, cable length or cable discontinuities, and system environment. When a communication failure is detected, the system may try to retransmit the data or may employ error correction schemes. The price for transmission recovery may be realized in lost performance. Performance degradation may be measured in bit error rate (BER).

SUMMARY

The illustrative embodiments recognize the disadvantages of the prior art and provide a mechanism and procedure for detecting cable length in a storage subsystem with wide ports. The mechanism may use in-situ bidirectional cable wrapping for determining different cable lengths. The mechanism under-margins transmitter output to failure for each external port and even for each PHY within a wide port. Based on the transition point from "good" wrap to "bad" wrap, the cable length may be determined. This assumes that there are a fixed number of predetermined cable lengths, such as "long" and "short." The transition point identifies if the cable is long or short, at which point the optimum tuning parameters can accordingly be set.

The illustrative embodiments further provide a mechanism to calibrate the high speed transmitter/receiver pair characteristics, and, thus, to optimize the transmission performance between subsystems. The mechanism mitigates the need for frequent error correction and does not incur the performance degradation associated with error correction techniques.

In one illustrative embodiment, a method for detecting cable length in a computing device comprises setting at least one transmitter parameter and at least one receiver parameter in the computing device and recording error rate, adjusting the at least one transmitter parameter and the at least one receiver parameter and recording the error rate until the at least one transmitter parameter and the at least one receiver parameter are margined from a minimum to a maximum, comparing the recorded error rates to error rates for known cable lengths, and determining a cable length based on the comparison.

In one exemplary embodiment, the method further comprises configuring a transmitter/receiver pair at the end device for diagnostic loopback. In another exemplary embodiment, the computing device is a serial attached SCSI switch module.

In one exemplary embodiment, the serial attached SCSI switch module comprises a switch processor. In another exemplary embodiment, the serial attached SCSI switch module comprises a data processor. In a further exemplary embodiment, the data processor comprises at least one of a cyclical redundancy check module, a pattern generator/check module, a data buffer, a packet controller, or a protocol controller. In yet another exemplary embodiment, the serial attached SCSI switch module comprises a serial attached SCSI switch.

In one exemplary embodiment, the end device is a serial attached SCSI end device. In another exemplary embodiment, the error rate is a bit error rate. In still another exemplary embodiment, the at least one transmitter parameter comprises transmitter amplitude. In yet another exemplary embodiment, the at least one receiver parameter comprises receiver equalization.

In another illustrative embodiment, a method for detecting cable length in a computing device comprises setting at least one transmitter parameter and at least one receiver parameter in the computing device and recording error rate, adjusting the at least one transmitter parameter and the at least one receiver parameter and recording the error rate until the at least one transmitter parameter and the at least one receiver parameter are margined from a minimum to a maximum, comparing the recorded error rates to error rates for known cable lengths, and determining a cable length based on the comparison, wherein the computing device comprises a plurality of transmitter/receiver pairs and is connected to an end device by a wide port cable.

In one exemplary embodiment, setting the at least one transmitter parameter and the at least one receiver parameter and recording error rate comprises establishing a command transmitter/receiver pair within the plurality of transmitter/receiver pairs for communication across the wide port cable.

In a further exemplary embodiment, the end device comprises a plurality of transmitter/receiver pairs. The method further comprises using the command transmitter/receiver pair to configure a next transmitter/receiver pair within the plurality of transmitter/receiver pairs at the end device for diagnostic loopback.

In a further exemplary embodiment, adjusting the at least one transmitter parameter and the at least one receiver parameter comprises repeatedly adjusting the at least one transmitter parameter and the at least one receiver parameter for a next transmitter/receiver pair until the at least one transmitter parameter and the at least one receiver parameter for all transmitter/receiver pairs within the plurality of transmitter/receiver pairs are margined from a minimum to a maximum.

In a still further exemplary embodiment, repeatedly adjusting the at least one transmitter parameter and the at least one receiver parameter comprises setting a transmitter parameter to a minimum value, setting a receiver parameter to a nominal value, calculating an error rate, logging the calculated error rate, and repeatedly incrementing the transmitter parameter, calculating the error rate, and logging the calculated error rate until the transmitter parameter reaches a maximum value.

In another exemplary embodiment, repeatedly adjusting the at least one transmitter parameter and the at least one receiver parameter further comprises setting a transmitter parameter to a nominal value, setting a receiver parameter to a minimum value, calculating an error rate, logging the calculated error rate, and repeatedly incrementing the receiver parameter, calculating the error rate, and logging the calculated error rate until the receiver parameter reaches a maximum value.

In one exemplary embodiment, the method further comprises averaging the error rate for the plurality of transmitter/receiver pairs. In another exemplary embodiment, the at least one transmitter parameter comprises transmitter amplitude. In yet another exemplary embodiment, the at least one receiver parameter comprises receiver equalization.

These and other features and advantages of the present invention will be described in, or will become apparent to those of ordinary skill in the art in view of, the following detailed description of the exemplary embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION OF THE ILLUSTRATIVE EMBODIMENTS

Figure 1A:
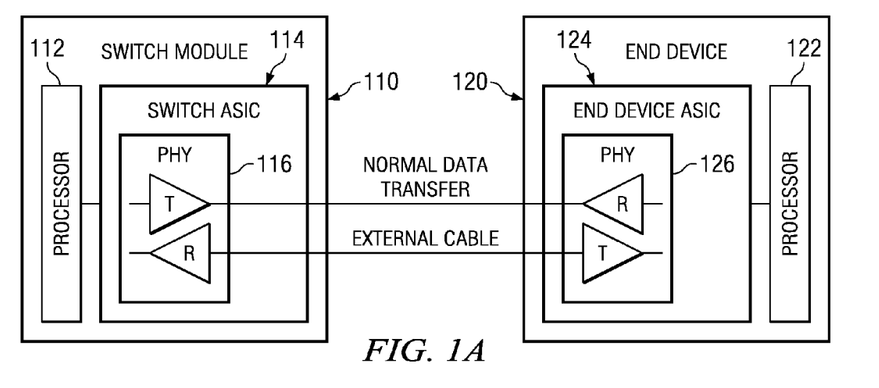
FIGS. 1A-1C are block diagrams of a narrow port in a storage network in accordance with one illustrative embodiment.
Figure 1B:
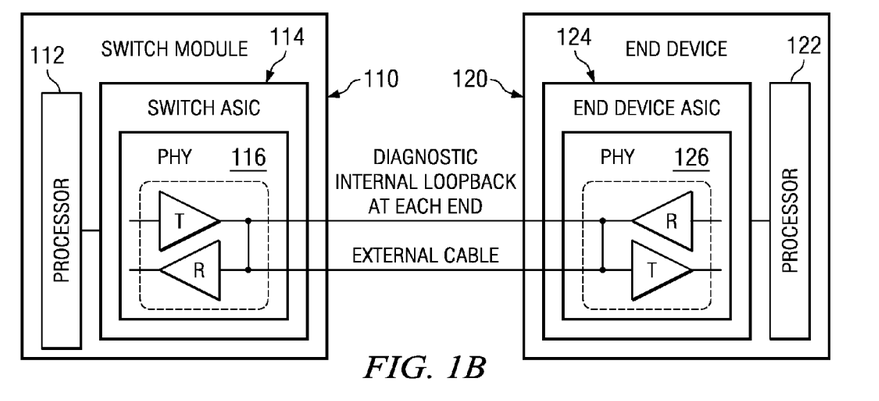
Figure 1C:
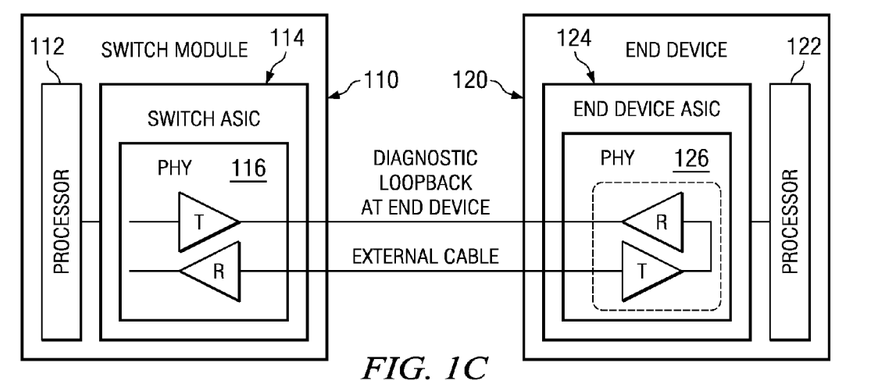

Referring to the figures, FIGS. 1A-1C are block diagrams of a narrow port in a storage network in accordance with one illustrative embodiment. More particularly with reference to FIG. 1A, switch module 110 has processor 112 and switch application specific integrated circuit (ASIC) 114. Switch ASIC 114 has physical transceiver element (PHY) 116. A PHY includes a transmitter and receiver pair. End device 120 has processor 122 and end device ASIC 124. End device ASIC 124 has PHY 126. PHY 116 is connected to PHY 126 via an external cable for normal data transfer. In one exemplary embodiment, switch module 110 may be a serial attached SCSI (SAS) switch module and end device 120 may be a SAS end device.

With reference now to FIG. 1B, PHY 116 in switch ASIC 114 and PHY 126 in end device ASIC 124 are configured for diagnostic internal loopback at each end. In accordance with the illustrative embodiment, PHY 116 and PHY 126 have the capability to connect the transmitter to the receiver to form an internal loopback. FIG. 1B illustrates how the SAS network is configured during diagnostic verification of the external interface. The SAS devices at each end of the cabled interface perform an internal wrap to test out the narrow port of each respective device.

Turning to FIG. 1C, PHY 126 in end device ASIC 124 is configured for diagnostic loopback at the end device. PHY 126 has the capability to connect the transmitter to the receiver to form an external loopback. FIG. 1C illustrates a configuration that provides the basis for the cable length detection mechanism and procedure for a narrow port to be described in further detail below.

Figure 2A:
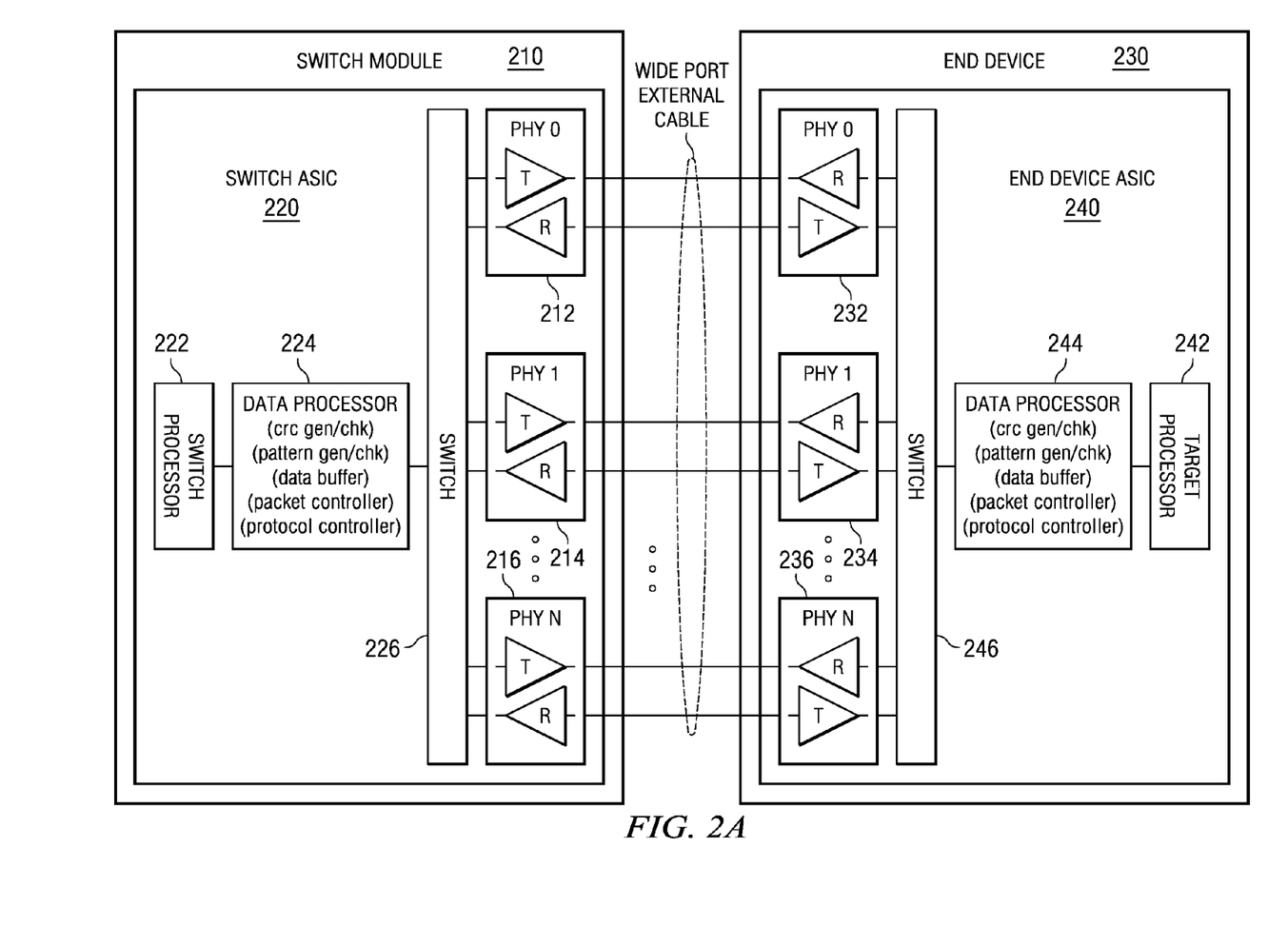
FIGS. 2A-2C are block diagrams of a wide port in a storage network in accordance with one illustrative embodiment.
Figure 2B:
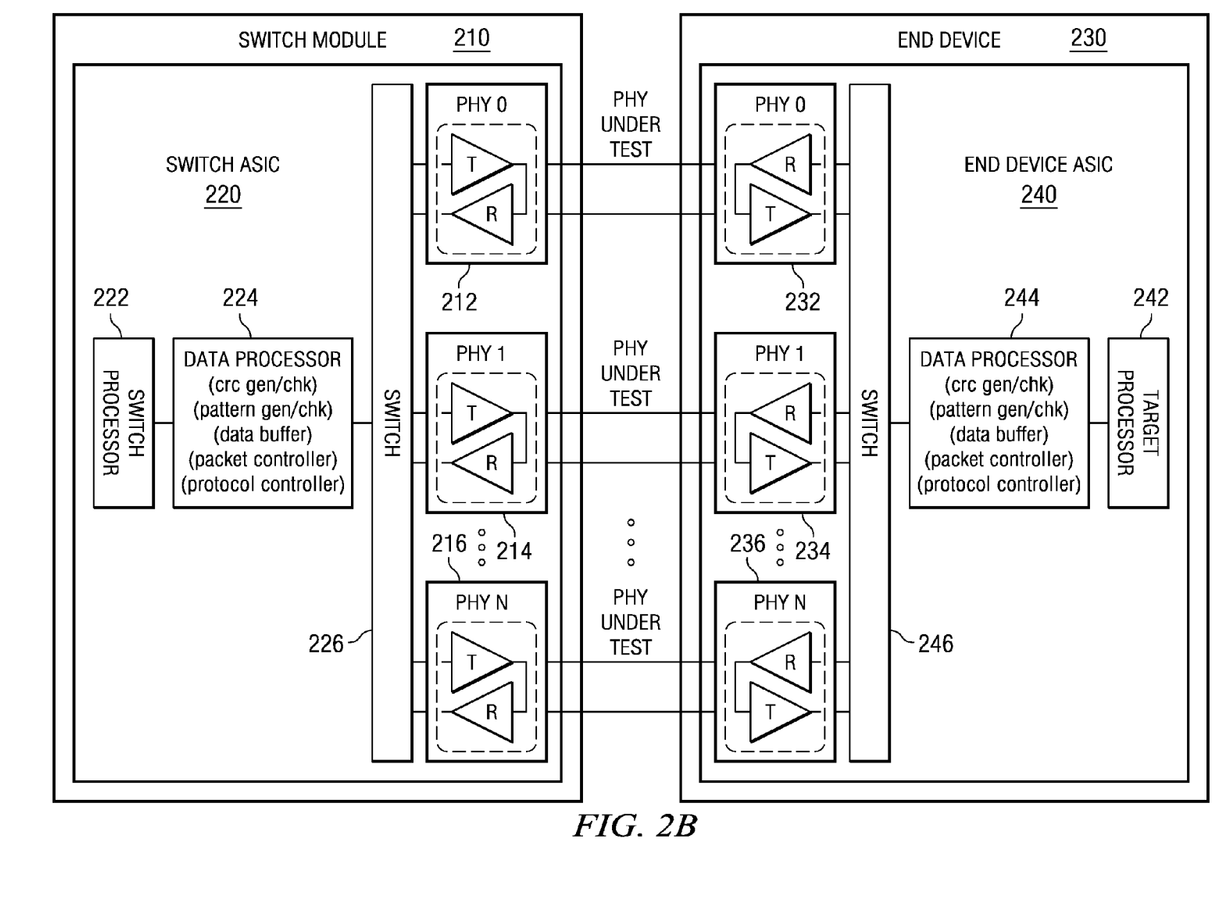
Figure 2C:
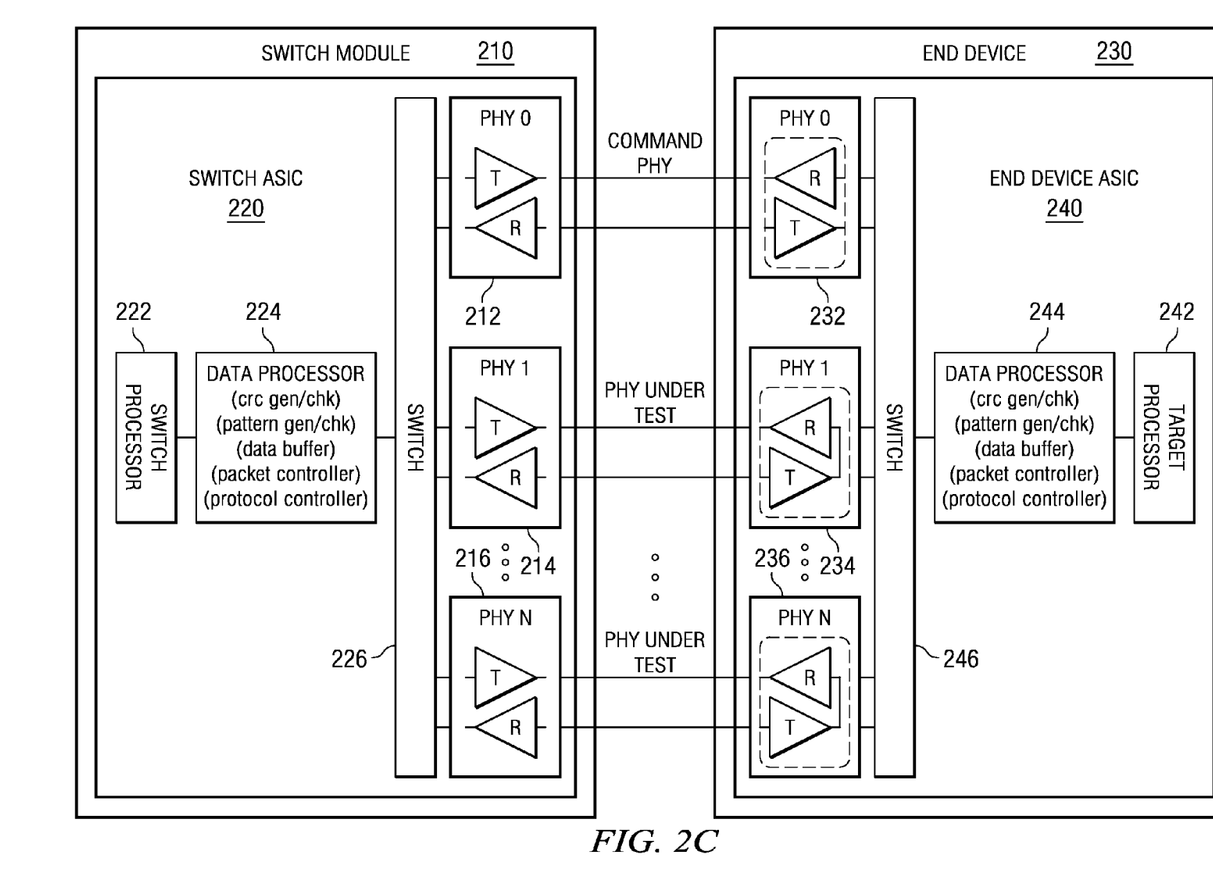

FIGS. 2A-2C are block diagrams of a wide port in a storage network in accordance with one illustrative embodiment. More particularly with reference to FIG. 2A, switch module 210 includes switch ASIC 220, which has switch processor 222, data processor 224, switch 226, and PHYs 0-N 212-216. Each PHY includes a transmitter and receiver pair. Data processor 224 comprises at least one of a cyclical redundancy check module, a pattern generator/check module, a data buffer, a packet controller, or a protocol controller. End device 230 includes end device ASIC 240, which has target processor 242, data processor 244, switch 246, and PHYs 0-N 232-236. PHYs 212-216 are connected to respective ones of PHYs 232-236 via a wide port external cable for normal data transfer. In one exemplary embodiment, switch module 210 may be a serial attached SCSI (SAS) switch module and end device 230 may be a SAS end device.

With reference now to FIG. 2B, PHYs 212-216 in switch ASIC 220 and PHYs 232-236 in end device ASIC 240 are configured for diagnostic internal loopback at each end. In accordance with the illustrative embodiment, PHYs 212-216 and PHYs 232-236 have the capability to connect the transmitter to the receiver to form an internal loopback. FIG. 2B illustrates how the wide port SAS network is configured during diagnostic verification of the external interface. The SAS devices at each end of the cabled interface perform an internal wrap to test out the narrow port of each respective device.

Turning to FIG. 2C, PHY 212 in switch ASIC 220 and PHY 232 in end device ASIC 240 are configured for normal data transfer. In the depicted example, PHY 0 212 is a command PHY. PHYs 1-N 234-236 in end device ASIC 240 are configured for diagnostic loopback at the end device. FIG. 2C illustrates a configuration that provides the basis for the cable length detection mechanism and procedure for a wide port of the illustrative embodiments to be described in further detail below.

Those of ordinary skill in the art will appreciate that the hardware depicted in FIGS. 1A-1C and FIGS. 2A-2C may vary. For example, switch module 110 in FIGS. 1A-1C may include more than one narrow port, and switch module 210 in FIGS. 2A-2C may include more than one wide port. Other modifications to the storage area network configurations may be made within the spirit and scope of the present invention. The depicted examples are not meant to state or imply any architectural limitations with respect to the present invention.

In accordance with an illustrative embodiment, a mechanism and procedure are provided for detecting cable length in a storage subsystem with wide ports. The mechanism may use in-situ bidirectional cable wrapping for determining different cable lengths. Note that high speed differential interfaces generally implement transmitter and receiver circuits, also known as serializer/deserializer (SERDES) circuits, which allow for adjustment of the transmitter amplitude as well as receiver equalization. A mechanism and procedure for adjusting transmitter amplitude and receiver equalization will be described in further detail below with reference to FIGS. 4-8.

During normal operation, it is desired to optimally tune these parameters to provide for the most robust system electrical performance.

To determine the length of any attached cables, a diagnostic procedure is defined that under-margins the transmitter output and detunes the receiver input to the point that the interface fails, for each external port and even for each PHY within a wide port. Based on the transition point from "successful" wrap to "failed" wrap, the cable length can be determined. This assumes that there are a fixed number of predetermined cable lengths, such as "long" cable and "short" cable. The transition point may identify the cable as long or short, at which point the optimum tuning parameters can accordingly be determined and programmed during normal operation.

Figure 3:
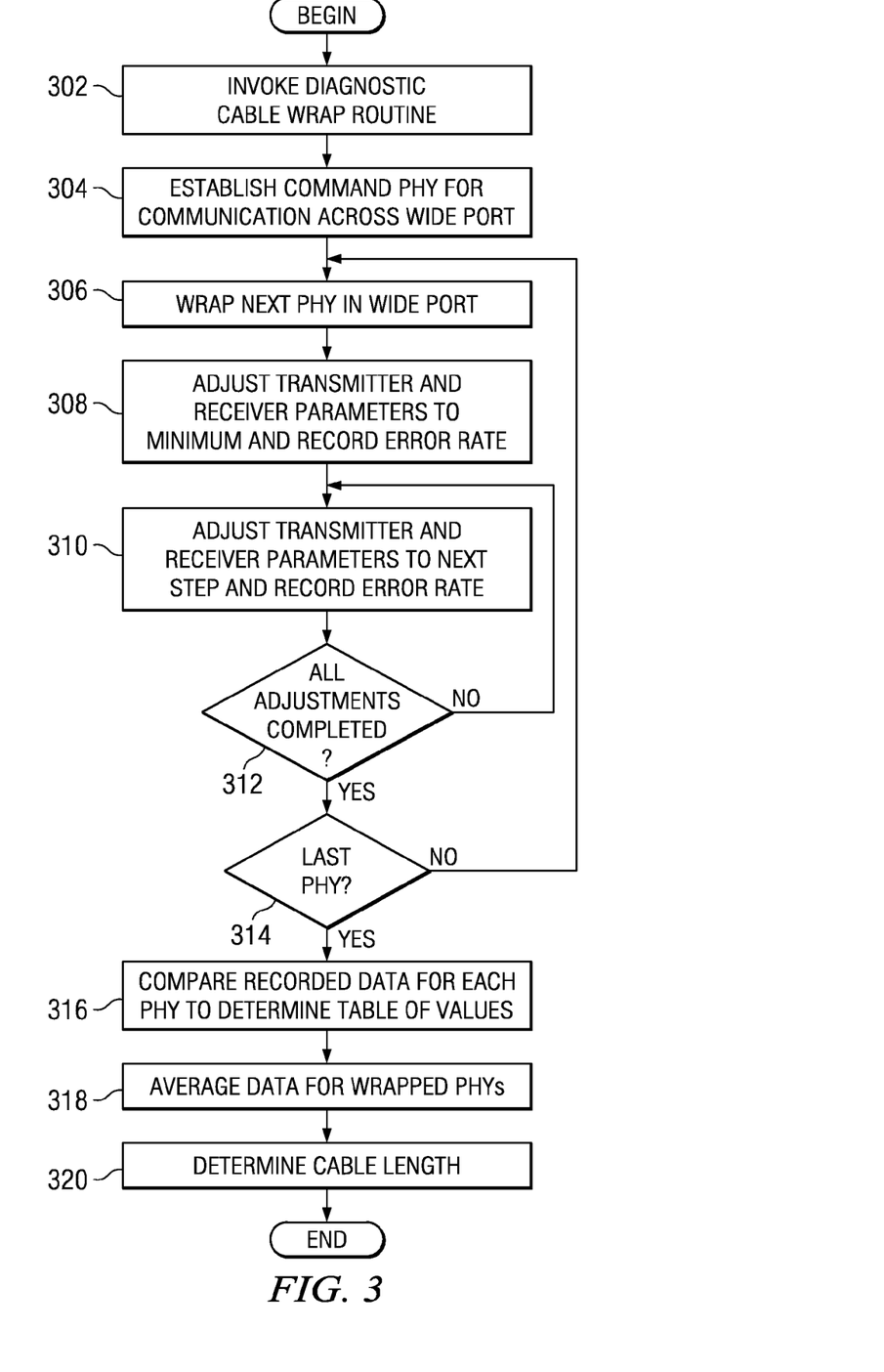
FIG. 3 is a flowchart illustrating operation of a mechanism for detecting cable length in a storage subsystem with wide ports in accordance with an illustrative embodiment.

FIG. 3 is a flowchart illustrating operation of a mechanism for detecting cable length in a storage subsystem with wide ports in accordance with an illustrative embodiment. It will be understood that each block of the flowchart illustrations, and combinations of blocks in the flowchart illustrations, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or by combinations of special purpose hardware and computer instructions.

Furthermore, the flowcharts are provided to demonstrate the operations performed within the illustrative embodiments. The flowcharts are not meant to state or imply limitations with regard to the specific operations or, more particularly, the order of the operations. The operations of the flowcharts may be modified to suit a particular implementation without departing from the spirit and scope of the present invention.

With reference now to FIG. 3, operation begins when the cable length connected to a wide port is unknown. The mechanism invokes the diagnostic cable wrap routine to configure the PHYs on each end for cable length detection (block 302). Then, the mechanism establishes a command PHY for communication across the wide port (block 304).

The mechanism wraps the next PHY in the wide port by configuring the PHY to connect the transmitter to the receiver to form an external loopback (block 306). The mechanism adjusts transmitter and receive parameters to minimum and records the error rate (block 308). The mechanism then adjusts transmitter and receiver parameters to a next step and records the error rate (block 310). The mechanism determines whether all adjustments are completed (block 312). If all adjustments are not completed, operation returns to block 310 to adjust transmitter and receiver parameters to a next step and record the error rate.

If all adjustments are completed for the PHY in block 312, the mechanism determines whether the last PHY has been tested (block 314). If the last PHY has not been tested, operation returns to block 306 to wrap the next PHY in the wide port.

If, however, the last PHY has been tested in block 314, the mechanism compares the recorded data for each PHY to determine a table of values (block 316). The mechanism averages the data for the wrapped PHYs (block 318). The mechanism then determines the cable length based on the average of the wrapped PHYs (block 320). Thereafter, operation ends.

During product testing, multiple cable lengths may be attached, whereby each specific cable length is characterized by collecting a set of data points as the wrap is detuned to failure. FIG. 3 illustrates how the characterization data reflects the range of data points with respect to optimum performance and failure. A table of these characterization values may be used during the wrap testing to identify whether a long cable or short cable, or other predetermined lengths, is attached. In other words, error rates may be recorded for known lengths. The mechanism may then compare the recorded values from blocks 308 and 310, or the average data from block 318, to the recorded error rates for known lengths. When characterizing wide ports, there are multiple link wraps that are tested. This provides multiple data points for more granular length determination of the attached cable. Note that the flowchart of FIG. 3 may operate for a single PHY for a narrow port cable.

In accordance with one illustrative embodiment, high speed serial interfaces used in high frequency applications may be dynamically margined beyond normal limits to determine optimum performance settings. The acquired setting represents a system calibration point for each physical path. Each system may store the calibration data for the respective point-to-point nodes of the serial interface connection.

A high speed differential interface may consist of four wires. Two wires are used differentially to represent a single signal, such as a transmit signal. Similarly, two wires are used differentially to represent a second signal, such as a receive signal. In this fashion, transmit and receive signals are implemented. In accordance with an illustrative embodiment, a mechanism is provided to optimize the performance of the data transmission between subsystems across the high speed interface.

The mechanism may vary the parameters of the stimulus and response mechanisms in such a manner as to stress the communication interface transfer function. The mechanism may then determine the design/guard band margin of the specific hardware under test. The resulting information may then be used as calibration factors for the specific hardware configuration.

For high speed SAS switches, the mechanism may use pre-emphasis/input compensation to test for margins. In this case, focus is across a communication interface, point-to-point communication from transmitter to receiver. This may cover blade slots, internal high speed fabric, and external cabling, for example.

In the past, a single calibration factor would be used for the system or for a limited set of cable lengths. The mechanism of the illustrative embodiment covers an unlimited number of cable lengths and paths (cables of variable width) as a result of the individual point-to-point calibration. Note that the mechanism of the illustrative embodiment may also be applied to internalized high speed fabrics as opposed to cabled interfaces. Instead of a nominal set of parameters, the system can be optimized for every path. Many times, the electrical length of a cable or path may not closely correlate to the physical length due to parasitics across the connection. This calibration mechanism may optimize the system for both physical and electrical differences.

The calibration may be applied for each point-to-point connection, such as a consistent set of subsystems cabled together. As another example, the calibration may be applied to a changing set of subsystems, such as system reconfiguration, addition or reduction of cabled subsystems, or subsystem degradation due to time or environment. Performance calibration may be initiated by power on reset, notification of a hardware change or reconfiguration, or increased error correction rate above a set limit.

Figure 4:
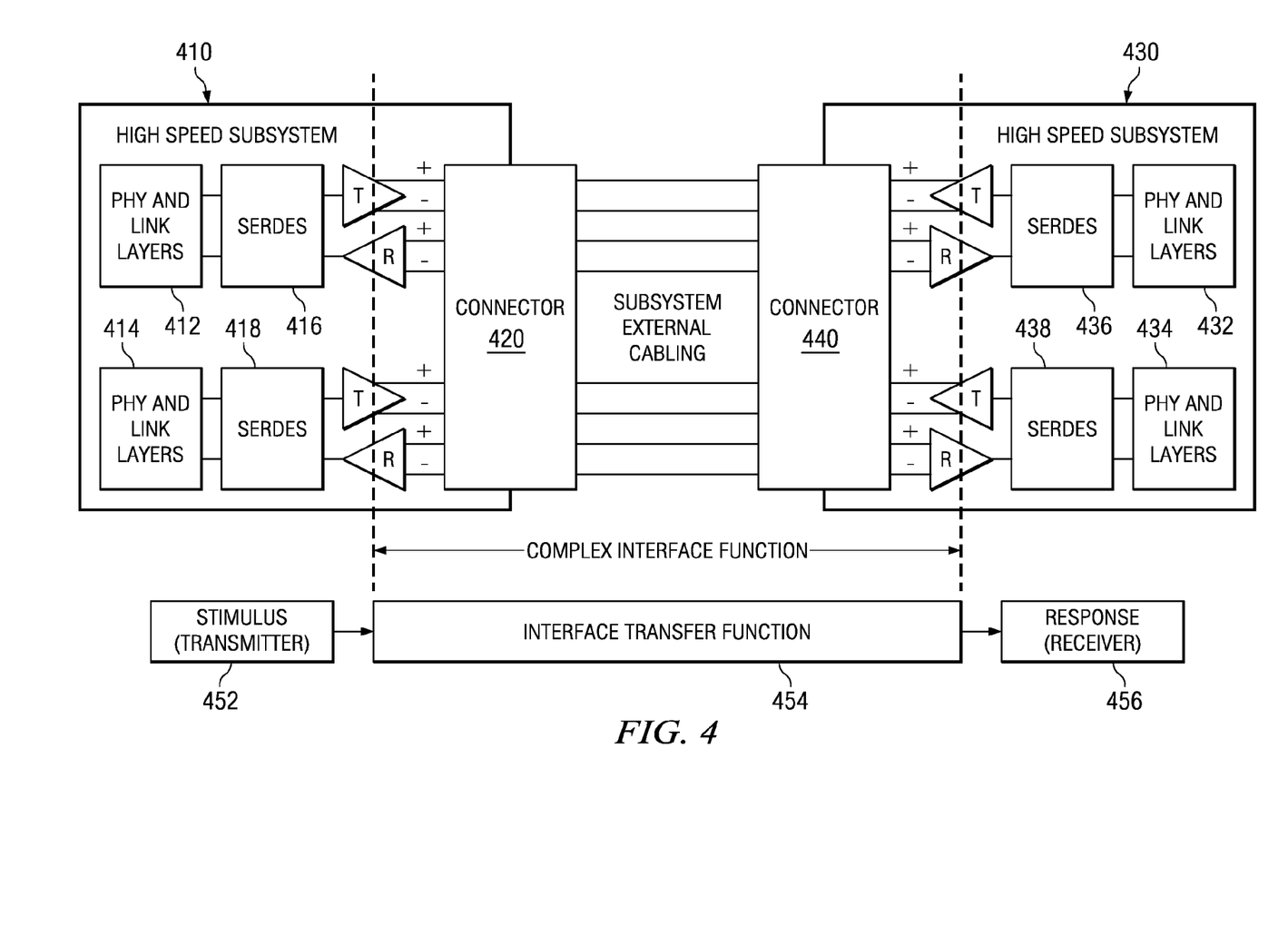
FIG. 4 is a block diagram illustrating an example system environment in which aspects of the illustrative embodiments may be implemented.

FIG. 4 is a block diagram illustrating an example system environment in which aspects of the illustrative embodiments may be implemented. High speed subsystem 410 is connected to high speed subsystem 430 via subsystem external cabling. High speed subsystem 410 includes PHY and link layers 412, which is connected to a transmitter/receiver pair through serialization/de-serialization (SERDES) circuit 416. High speed subsystem 410 also includes PHY and link layers 414, which is connected to a transmitter/receiver pair through serialization/de-serialization (SERDES) circuit 418. The transmitter/receiver pairs are connected to the subsystem external cabling through connector 420. High speed subsystem 430 includes PHY and link layers 432, which is connected to a transmitter/receiver pair through serialization/de-serialization (SERDES) circuit 436. High speed subsystem 430 also includes PHY and link layers 434, which is connected to a transmitter/receiver pair through serialization/de-serialization (SERDES) circuit 438. The transmitter/receiver pairs in high speed subsystem 430 are connected to the subsystem external cabling through connector 440.

In the example depicted in FIG. 4, the PHY and link layers 412, 414 and SERDES circuits 416, 418 in high speed subsystem 410 represent stimulus (transmitter) 452. The PHY and link layers 432, 434 and SERDES circuits 436, 438 in high speed subsystem 430 represent response (receiver) 456. The transceiver pairs, connectors 420, 440, and subsystem external cabling represent a complex interface transfer function 454. In accordance with the illustrative embodiment, the mechanism varies stimulus and response parameters. The range of functionality determines a performance margin for a given set of externally cabled subsystems.

Figure 5:
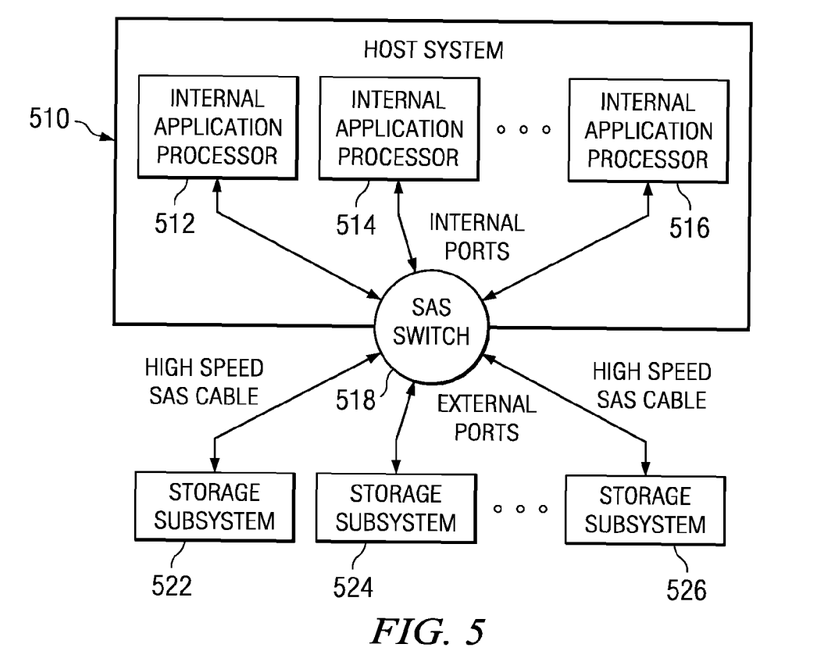
FIG. 5 is a block diagram illustrating a subsystem interface environment in which aspects of the illustrative embodiments may be implemented.

FIG. 5 is a block diagram illustrating a subsystem interface environment in which aspects of the illustrative embodiments may be implemented. Host system 510 includes internal application processors 512-516, which are connected to SAS switch 518 at internal ports. Storage subsystems 522-526 are connected to SAS switch 518 via high speed SAS cables at external ports. The mechanism of the illustrative embodiment may margin each point-to-point connection to find the optimum performance setting. The mechanism may then calibrate data stored for each point-to-point connection.

Figure 6:
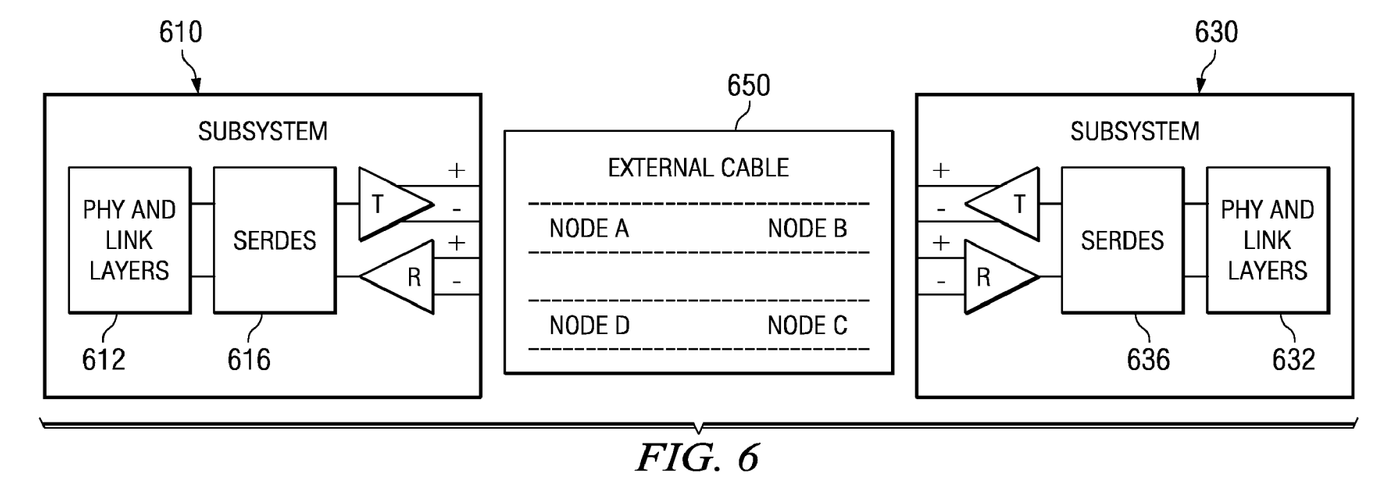
FIG. 6 is a block diagram that illustrates a high speed point-to-point calibration procedure in accordance with an illustrative embodiment.

FIG. 6 is a block diagram that illustrates a high speed point-to-point calibration procedure in accordance with an illustrative embodiment. Subsystem 610 includes PHY and link layers 612, which are connected to a transmit/receive pair via SERDES 616. Subsystem 630 includes PHY and link layers 632, which are connected to a transmit/receive pair via SERDES 636. The transmit/receive pair of subsystem 610 is connected to the transmit/receive pair of subsystem 630 by external cable 650.

A node-to-node connection includes the output transmitter, printed circuit board paths, connectors, internal high speed fabric, external cables, and the input receiver. The calibration mechanism of the illustrative embodiment sets transmit and receiver parameters to nominal design value.

The mechanism then determines the transmit set point for one end of the point-to-point external connection (Node A). The mechanism generates self test patterns at the source switch and monitors expected data at the receive switch at the other end of the external connection (Node B). The parameter the mechanism measures is bit error rate (BER). In one exemplary embodiment, a unit of BER is one error per megabit of data received. The calibration mechanism then margins the transmit settings within a minimum (min) to maximum (max) range. The transmit set point for Node A corresponds to the transmit set point that achieved the highest BER at the receiver, Node B.

The calibration mechanism then determines the receiver set point for the other end of the point-to-point external connection (Node B). The mechanism generates self test patterns at the source switch and monitors expected data at the receive switch, Node B of the external connection. The calibration mechanism margins the receiver settings from min to max range. The receiver set point of Node B corresponds to the receiver set point that achieved the highest BER at the receiver.

The calibration mechanism then repeats the above calibration sequence for external cable Node C and Node D.

Figure 7:
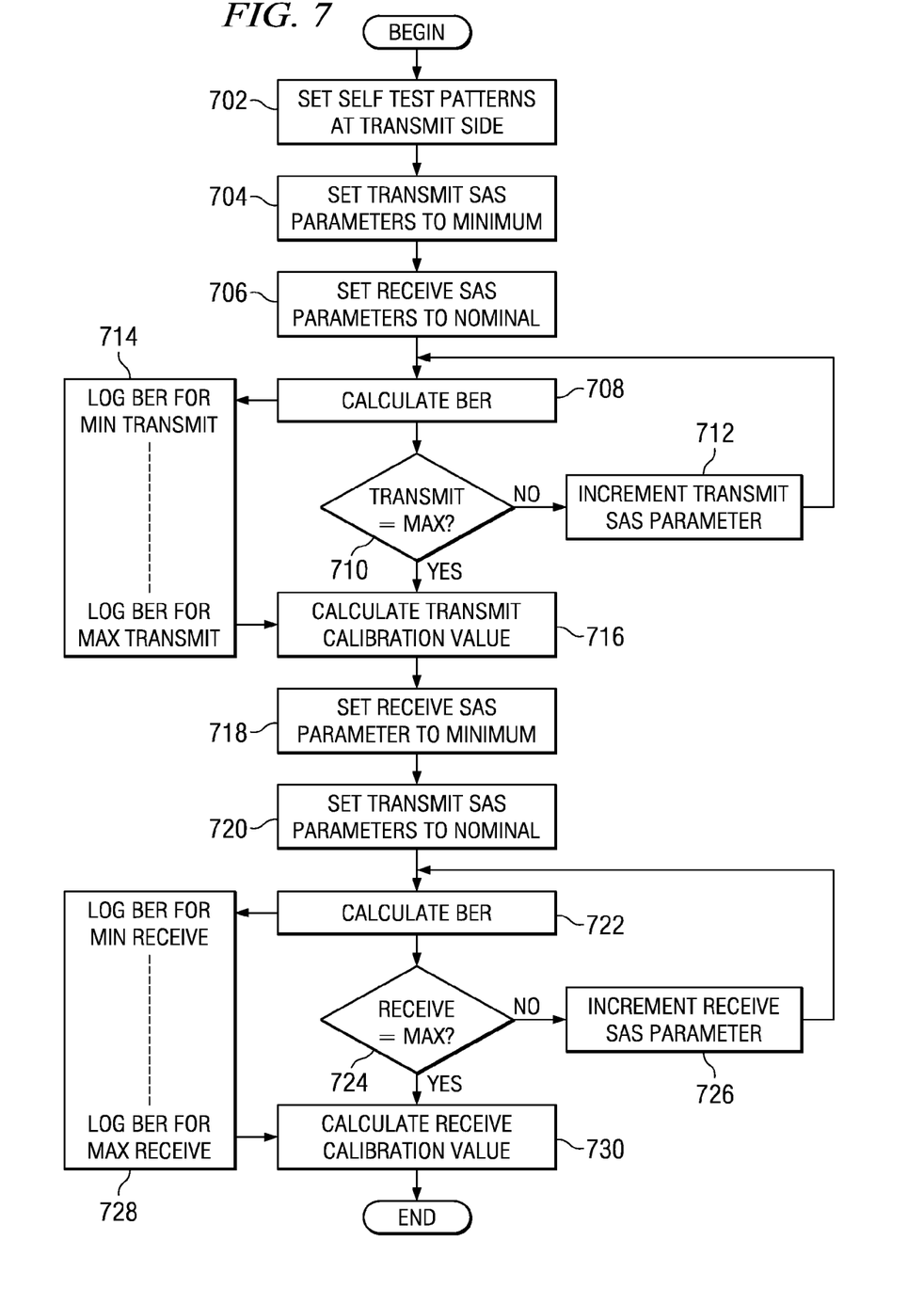
FIG. 7 is a flowchart illustrating operation of a point-to-point calibration mechanism in accordance with an illustrative embodiment.

FIG. 7 is a flowchart illustrating operation of a point-to-point calibration mechanism in accordance with an illustrative embodiment. Operation begins and the calibration mechanism sets self test patterns at the transmit side (block 702). The calibration mechanism sets the transmit SAS parameters to minimum (block 704) and sets receive SAS parameters to nominal (block 706).

The calibration mechanism calculates bit error rate (BER) (block 708). The mechanism then determines whether the transmit parameter is equal to the maximum (block 710). If the transmit parameter is not equal to the maximum, then the calibration mechanism increments the transmit SAS parameter (block 712), and operation returns to block 708 to calculate the BER for the incremented transmit parameter. As the calibration mechanism margins the transmit SAS parameter from minimum to maximum, the mechanism logs BER for each parameter value, as seen in block 714.

If the transmit parameter is equal to the maximum in block 710, then the calibration mechanism calculates the transmit calculation value (block 716). Next, the calibration mechanism sets the receive SAS parameter to minimum (block 718) and sets the transmit SAS parameter to nominal (block 720).

The calibration mechanism calculates BER (block 722). The mechanism then determines whether the receive parameter is equal to the maximum (block 724). If the receive parameter is not equal to the maximum, then the calibration mechanism increments the receive SAS parameter (block 726), and operation returns to block 722 to calculate the BER for the incremented receive parameter. As the calibration mechanism margins the receive SAS parameter from minimum to maximum, the mechanism logs BER for each parameter value, as seen in block 728.

If the receive parameter is equal to the maximum in block 724, then the calibration mechanism calculates the receive calibration value (block 730). Thereafter, operation ends.

Figure 8:
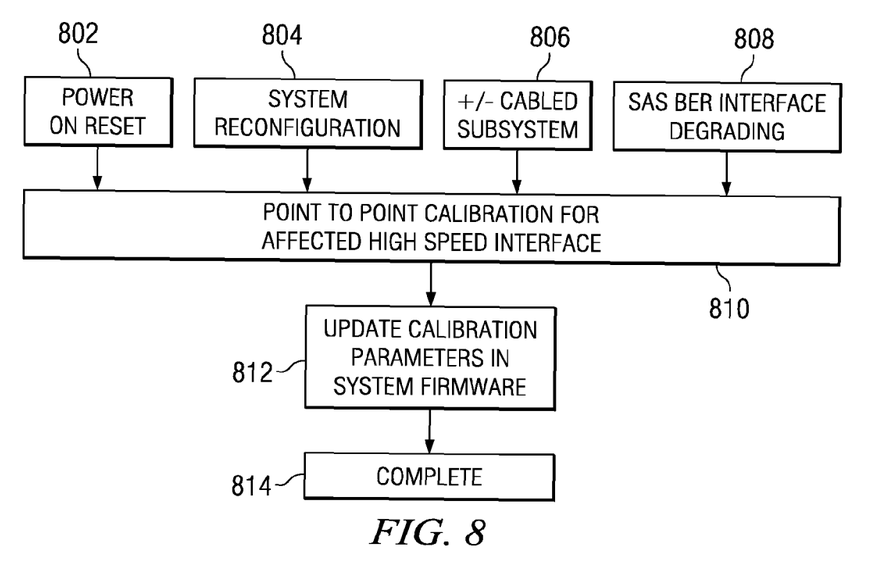
FIG. 8 is a flowchart illustrating system calibration in accordance with an illustrative embodiment.

FIG. 8 is a flowchart illustrating system calibration in accordance with an illustrative embodiment. Operation begins responsive to one of a plurality of initiating conditions, including power on reset (block 802), system reconfiguration (block 804), added or reduced cabled subsystems (block 806), or SAS bit error rate interface degrading (block 808). The calibration mechanism, in response to an initiating condition, performs point-to-point calibration for the affected high speed interface (block 810). Then, the calibration mechanism updates calibration parameters in the system firmware (block 812). Thereafter, system calibration is complete (block 814), and operation ends.

Thus, the illustrative embodiments solve the disadvantages of the prior art by providing a mechanism and procedure for detecting cable length in a storage subsystem with wide ports. The mechanism may use in-situ bidirectional cable wrapping for determining different cable lengths. The mechanism under-margins transmitter output to failure for each external port and even for each PHY within a wide port. Based on the transition point from "good" wrap to "bad" wrap, the cable length may be determined. This assumes that there are a fixed number of predetermined cable lengths, such as "long" and "short." The transition point identifies if the cable is long or short, at which point the optimum tuning parameters can accordingly be set.

The illustrative embodiments further provide a mechanism to calibrate the high speed transmitter/receiver pair characteristics, and, thus, to optimize the transmission performance between subsystems. The mechanism mitigates the need for frequent error correction and does not incur the performance degradation associated with error correction techniques.

It should be appreciated that the illustrative embodiments may take the form of an entirely hardware embodiment, an entirely software embodiment or an embodiment containing both hardware and software elements. In one exemplary embodiment, the mechanisms of the illustrative embodiments are implemented in software, which includes but is not limited to firmware, resident software, microcode, etc.

Furthermore, the illustrative embodiments may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read-only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for detecting cable length in a computing device, the method comprising:
    setting, by a processor in the computing device, at least one transmitter parameter and at least one receiver parameter in the computing device and recording error rate;
    adjusting, by the processor, the at least one transmitter parameter and the at least one receiver parameter and recording the error rate until the at least one transmitter parameter and the at least one receiver parameter are margined from a minimum to a maximum;
    comparing, by the processor, the recorded error rates to error rates for known cable lengths; and
    determining, by the processor, a cable length based on the comparison, wherein the computing device comprises a plurality of transmitter/receiver pairs and is connected to an end device by a wide port cable.

2. The method of claim 1, wherein the computing device is a serial attached SCSI switch module.

3. The method of claim 1, wherein recording error rate comprises sending a test pattern from a transmitter of a given transmitter/receiver pair, receiving a returned test pattern at a receiver of the given transmitter/receiver pair, and comparing the returned test pattern to the sent test pattern to determine error rate.

4. The method of claim 1, wherein the end device is a serial attached SCSI end device.

5. The method of claim 1, wherein the error rate is a bit error rate.

6. The method of claim 1, wherein setting the at least one transmitter parameter and the at least one receiver parameter and recording error rate comprises establishing a command transmitter/receiver pair within the plurality of transmitter/receiver pairs for communication across the wide port cable.

7. The method of claim 1, further comprising:
    averaging the error rate for the plurality of transmitter/receiver pairs.

8. The method of claim 1, wherein the at least one transmitter parameter comprises transmitter amplitude.

9. The method of claim 1, wherein the at least one receiver parameter comprises receiver equalization.

10. The method of claim 6, wherein adjusting the at least one transmitter parameter and the at least one receiver parameter comprises:
    using the command transmitter/receiver pair to configure a next transmitter/receiver pair within the plurality of transmitter/receiver pairs at the end device for diagnostic loopback.

11. A computer program product comprising a non-transitory computer useable medium having a computer readable program, wherein the computer readable program, when executed on a computing device, causes the computing device to:
    set at least one transmitter parameter and at least one receiver parameter in the computing device and recording error rate;
    adjust the at least one transmitter parameter and the at least one receiver parameter and recording the error rate until the at least one transmitter parameter and the at least one receiver parameter are margined from a minimum to a maximum;
    compare the recorded error rates to error rates for known cable lengths; and
    determine a cable length based on the comparison, wherein the computing device comprises a plurality of transmitter/receiver pairs and is a switch module connected to an end device by a wide port cable.

12. The computer program product of claim 11, wherein recording error rate comprises sending a test pattern from a transmitter of a given transmitter/receiver pair, receiving a returned test pattern at a receiver of the given transmitter/receiver pair, and comparing the returned test pattern to the sent test pattern to determine error rate.

13. The computer program product of claim 11, wherein setting the at least one transmitter parameter and the at least one receiver parameter and recording error rate comprises establishing a command transmitter/receiver pair within the plurality of transmitter/receiver pairs for communication across the wide port cable.

14. The computer program product of claim 11, wherein the computer readable program, when executed on the computing device, further causes the computing device to:
    average the recorded error rate for the plurality of transmitter/receiver pairs.

15. The computer program product of claim 13, wherein adjusting the at least one transmitter parameter and the at least one receiver parameter comprises:
    using the command transmitter/receiver pair to configure a next transmitter/receiver pair within the plurality of transmitter/receiver pairs at the end device for diagnostic loopback.

16. A computing device, comprising:
    at least one transmitter/receiver pair; and
    a processor, wherein the processor is configured to:
        set at least one transmitter parameter and at least one receiver parameter in the computing device and recording error rate;
        adjust the at least one transmitter parameter and the at least one receiver parameter and record the error rate until the at least one transmitter parameter and the at least one receiver parameter are margined from a minimum to a maximum;
        compare the recorded error rates to error rates for known cable lengths; and
        determine a cable length based on the comparison, wherein the at least one transmitter/receiver pair comprises a plurality of transmitter/receiver pairs and is a switch module connected to an end device by a wide port cable.

17. The computing device of claim 16, wherein recording error rate comprises sending a test pattern from a transmitter of a given transmitter/receiver pair, receiving a returned test pattern at a receiver of the given transmitter/receiver pair, and comparing the returned test pattern to the sent test pattern to determine error rate.

18. The computing device of claim 16, wherein setting the at least one transmitter parameter and the at least one receiver parameter and recording error rate comprises establishing a command transmitter/receiver pair within the plurality of transmitter/receiver pairs for communication across the wide port cable.

19. The computing device of claim 16, wherein the processor is configured to average the recorded error rate for the plurality of transmitter/receiver pairs.

20. The computing device of claim 18, wherein the processor is configured to use the command transmitter/receiver pair to configure a next transmitter/receiver pair within the plurality of transmitter/receiver pairs at the end device for diagnostic loopback.

* * * * *